United States Patent
Cao et al.

(10) Patent No.: US 12,270,729 B2
(45) Date of Patent: Apr. 8, 2025

(54) CROSSBEAM FOR MEASURING DEFORMATION VELOCITIES OF SURFACE OF MATERIAL UNDER DYNAMIC LOADS

(71) Applicant: WUHAN OPTICS VALLEY ZOYON SCIENCE AND TECHNOLOGY CO., LTD., Hubei (CN)

(72) Inventors: Min Cao, Hubei (CN); Dejin Zhang, Hubei (CN); Hong Lin, Hubei (CN); Xinlin Wang, Hubei (CN); Yi Lu, Hubei (CN)

(73) Assignee: WUHAN OPTICS VALLEY ZOYON SCIENCE AND TECHNOLOGY CO., LTD., Wuhan (CN)

( * ) Notice: Subject to any disclaimer, the term of this patent is extended or adjusted under 35 U.S.C. 154(b) by 458 days.

(21) Appl. No.: 17/293,911

(22) PCT Filed: Mar. 8, 2019

(86) PCT No.: PCT/CN2019/077480
§ 371 (c)(1),
(2) Date: May 13, 2021

(87) PCT Pub. No.: WO2020/147180
PCT Pub. Date: Jul. 23, 2020

(65) Prior Publication Data
US 2022/0017126 A1    Jan. 20, 2022

(30) Foreign Application Priority Data

Jan. 15, 2019  (CN) .......................... 201910034902.X

(51) Int. Cl.
*G01M 5/00*    (2006.01)
*G01B 11/02*    (2006.01)
(Continued)

(52) U.S. Cl.
CPC ............... *G01M 5/00* (2013.01); *G01B 11/16* (2013.01); *G01N 3/32* (2013.01); *G01P 3/36* (2013.01); *G01B 11/026* (2013.01)

(58) Field of Classification Search
CPC ....... G01M 5/00; G01M 5/0041; G01B 11/16; G01B 11/026; G01B 11/306; G01B 21/08;
(Continued)

(56) References Cited

U.S. PATENT DOCUMENTS 5,753,808 A    5/1998  Johnson
9,261,354 B1 *  2/2016  Mercado ................ G01B 11/16
(Continued)

FOREIGN PATENT DOCUMENTS

CN    102162217 A    8/2011
CN    102337721 A    2/2012
(Continued)

OTHER PUBLICATIONS

K. Rainer Massarsch, "Vibration Isolation Using Gas-Filled Cushions", Oct. 2005, Conference Paper: Geo-Frontiers Congress 2005 (Year: 2005).*

(Continued)

*Primary Examiner* — Tarifur R Chowdhury
*Assistant Examiner* — Joshua M Carlson
(74) *Attorney, Agent, or Firm* — Dickinson Wright PLLC

(57) ABSTRACT

A crossbeam for measuring deformation velocities of a surface of a material under a dynamic load includes a crossbeam body, a first type of velocimeter and a second type of velocimeter-mounted on the crossbeam body. The crossbeam body is mounted on a measurement carrier. The measurement carrier is configured to move along the surface of the material and apply a dynamic load to the surface. The first type of velocimeter is configured to measure the verti- (Continued)

cally resilient deformation velocity of the surface behind an action force of the dynamic load. The second type of velocimeter is configured to measure the vertical downward deformation velocity of the surface in front of the action force of the dynamic load. The vertically resilient deformation velocity and the vertically downward deformation velocity of the surface can be simultaneously and quickly obtained by the first and second types of velocimeters.

3 Claims, 1 Drawing Sheet

(51) Int. Cl.
*G01B 11/16* (2006.01)
*G01N 3/32* (2006.01)
*G01P 3/36* (2006.01)

(58) Field of Classification Search
CPC ............. G01B 21/32; G01N 3/32; G01P 3/36; E01C 23/01
See application file for complete search history.

(56) References Cited

U.S. PATENT DOCUMENTS

| | | | |
|---|---|---|---|
| 9,732,479 B2 * | 8/2017 | Madsen | G01M 5/0091 |
| 2012/0010828 A1 * | 1/2012 | Ullidtz | G01B 21/20 |
| | | | 702/42 |
| 2013/0283924 A1 * | 10/2013 | McCullough | G01N 3/00 |
| | | | 250/461.1 |

FOREIGN PATENT DOCUMENTS

| | | | | |
|---|---|---|---|---|
| CN | 102444079 A | | 5/2012 | |
| CN | 102535317 A | * | 7/2012 | |
| CN | 103452032 A | * | 12/2013 | |
| CN | 104129405 A | | 11/2014 | |
| CN | 104929023 A | | 9/2015 | |
| CN | 109724884 A | | 5/2019 | |
| JP | 2006162630 A | * | 6/2006 | ............ E01B 35/12 |
| JP | 2018181116 A | * | 11/2018 | |
| WO | 9631655 A1 | | 10/1996 | |

OTHER PUBLICATIONS

A Review of Pavement High Speed Detection, Journal of Geomatics, Feb. 2015 vol. 40 No. 1, Zhang Dejin, Li Qingquan (8 Pages).

Research Status of Highway Pavement Structure Inspection Technology, Jin Hui, Nanjing Yangtze River Second Bridge Co., Ltd., Nanjing, Jiangsu 210038, Chinese Library Classification No. U416.2 Document Identification Code: A, Article No. 1671-0711 (2017) 08 (Part 2)-0065-02 (3 Pages (including abstract)).

Deflection Measurement Methods Based on Velocities of Pavement Deflections, Key Laboratory for Geo-Environment Monitoring of Coastal Zone of the Natl Admin of Surveying, Mapping and GeoInformation; Shenzhen Key Laoratory of Spatial Smart Sensing and Services, Shenzhen University, Shenzhen 518060, China; Wuhan Wuda Zoyon Science and Technology Co. Ltd., Wuhan 430223, China; Zhang De-jin, Li Qing-quan; Cao Min, Lin Hong (8 Pages).

A Correction Model for the Continuous Deflection Measurement of Pavements Under Dynamic Loads, Liao Jianghai, Lin Hong, Li Qingquan, Zhang Dejin, IEEE Access, vol. 7, 2019, Date of Publication Oct. 14, 2019 (16 Pages).

Accurate Measurement of Pavement Deflection Velocity Under Dynamic Loads; Li He, Hong Lin, Qin Zou, Dejin Zhng, Automation in Construction 83 (2017) 149-162, 0926-5805 / 2017 Published by Elsevier B.V. (14 Pages).

* cited by examiner

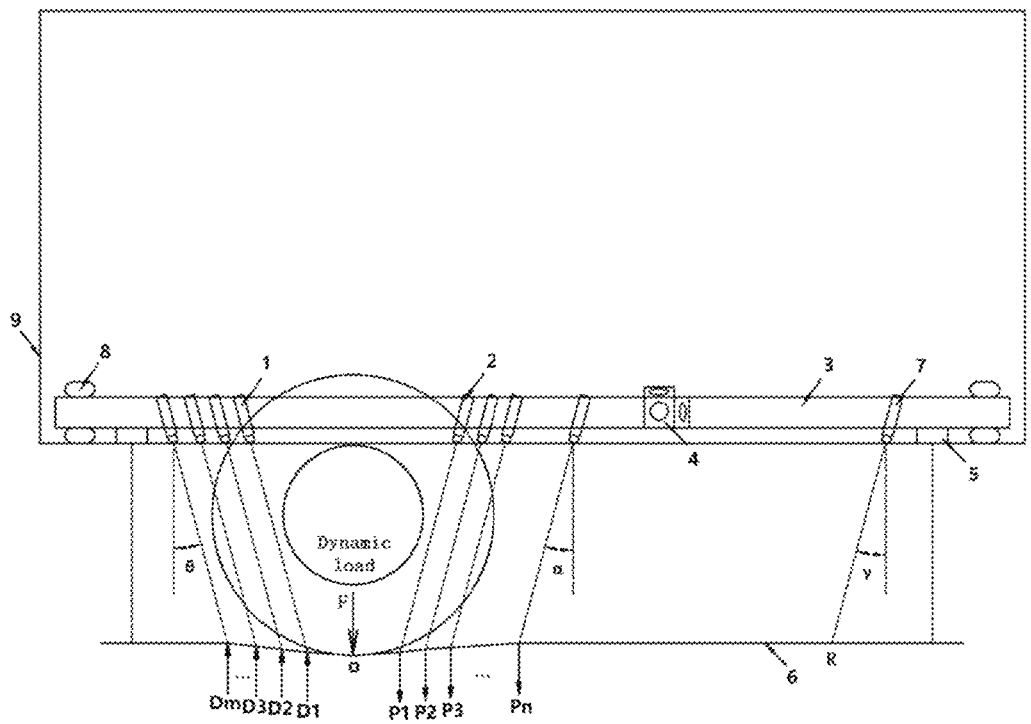

CROSSBEAM FOR MEASURING DEFORMATION VELOCITIES OF SURFACE OF MATERIAL UNDER DYNAMIC LOADS

CROSS-REFERENCE TO RELATED APPLICATION

The present application is a 35 U.S.C. § 371 national stage application of PCT Application No. PCT/CN2019/077480, filed on Mar. 8, 2019, which claims priority from Chinese Application No. 201910034902X filed on Jan. 15, 2019, entitled "Crossbeam for Measuring Deformation Velocities of Surface of Material under Dynamic Loads", which is hereby incorporated by reference in its entirety.

FIELD OF TECHNOLOGY

The embodiments of the present application relate to the technical field of material inspection, and in particular, to a crossbeam for measuring deformation velocities of a surface of a material under dynamic loads.

BACKGROUND

When a force acts on the exterior of a material (structure or member), stress and strain will be generated in the interior of the material (structure or member). The ratio of stress to strain in a material under force is referred to as modulus. The modulus of elasticity can be regarded as an index to measure the degree of difficulty in elastic deformation of the material, the greater the modulus of elasticity, the greater the stress that causes a certain elastic deformation of the material, namely, the greater the rigidity of the material, and that is, the smaller the elastic deformation under a certain stress. In order to evaluate the modulus of elasticity of a material, strain gauges are often used to directly measure the value of strain of the measured material under force, that is, the modulus of the measured material is obtained by direct distance measurement. Such measurement methods have problems such as low measurement efficiency, as well as large errors in measurement results due to the fluctuation of the surface texture of the material.

Under the action of moving loads (dynamic loads), the deformation of the material will propagate along the movement direction of loads, that is, under the action of the dynamic loads, the measured material will have a deformation velocity. The slope of the deformation curve of the material may be obtained by the ratio of the deformation velocities of the material to the moving velocity of the dynamic loads, and the modulus of the measured material can be obtained in combination with the deflection curve equation of the material deformation. This measurement method has high measurement efficiency, and provides reliable measurement results which are not affected by the fluctuation of the surface texture of the material, hence, it can be used for rapid measurement of the modulus of the measured material. Among the measurement methods for the modulus of the material based on the deformation velocity of the material, it is the key to rapidly and accurately measure the deformation velocity of the surface of the material. Therefore, there is an urgent need for a method for measuring the deformation velocity of the surface of the material.

SUMMARY

In order to solve the problems above, the embodiments of the present application provide a crossbeam for measuring deformation velocity of a surface of a material under dynamic loads to overcome or at least partially solve the problems above.

The embodiments of the present application provide a crossbeam for measuring deformation velocities of a surface of a material under dynamic loads, comprising: a crossbeam body, a first type of velocimeter, and a second type of velocimeter; wherein both the first type of velocimeter and the second type of velocimeter are mounted on the crossbeam body, and the crossbeam body is mounted on a measurement carrier; the measurement carrier is configured to move along a surface of a measured material and apply dynamic loads to the surface of the measured material; the first type of velocimeter is configured to measure a vertically resilient deformation velocity of the surface of the measured material behind the dynamic load acting force; and the second type of velocimeter is configured to measure a vertically downward deformation velocity of the surface of the measured material ahead of the dynamic load acting force.

For the crossbeam for measuring deformation velocities of the surface of the material under dynamic loads provided by the embodiments of the present application, the vertically resilient deformation velocity as well as the vertically downward deformation velocity of the surface of the measured material may be obtained quickly and accurately simultaneously through the first type of velocimeter and the second type of velocimeter, respectively.

BRIEF DESCRIPTION OF THE DRAWINGS

In order to illustrate the embodiments of the present application or the technical solutions in the prior art more clearly, the drawings needed in the description of the embodiments or the prior art will be briefly introduced as follows. Obviously, the drawings in the following description are only some of the embodiments of the present application. For those of ordinary skill in the art, other embodiments may be obtained based on these drawings without paying any creative effort.

FIG. 1 is a schematic structural diagram of a crossbeam for measuring deformation velocities of a surface of a material under dynamic loads according to an embodiment of the present application.

Description of reference numerals:

| | |
|---|---|
| 1 first type of velocimeter | 2 second type of velocimeter |
| 3 crossbeam body | 4 gyroscope |
| 5 range finder | 6 measured material |
| 7 third type of velocimeter | 8 shock-absorbing air bag |
| 9 measurement carrier | |

DETAILED DESCRIPTION

In order to illustrate the objectives, technical solutions and advantages of the embodiments of the present application more clearly, the technical solutions in the embodiments of the present application will be described clearly below in conjunction with the accompanying drawings in the embodiments of the present application. Obviously, the embodiments described are some of the embodiments of the present application, rather than all of the embodiments. Based on the embodiments in the present application, all other embodiments obtained by those of ordinary skill in the art without creative effort shall fall within the protection scope of the present application.

To address the need for measuring deformation velocities of a surface of a material in the prior art, an embodiment of the present application provides a crossbeam for measuring deformation velocities of the surface of the material, which can obtain the vertically resilient deformation velocity as well as the vertically downward deformation velocity of the measured material simultaneously. As shown in FIG. 1, the crossbeam comprises: a crossbeam body 3, a first type of velocimeter 1, and a second type of velocimeter 2; wherein both the first type of velocimeter 1 and the second type of velocimeter 2 are mounted on the crossbeam body 3, and the crossbeam body 3 is mounted on a measurement carrier 9; the measurement carrier 9 is configured to move along a surface of a measured material 6 and apply dynamic loads to the surface of the measured material 6; the first type of velocimeter 1 is configured to measure a vertically resilient deformation velocity of the surface of the measured material 6 behind the dynamic load acting force; and the second type of velocimeter 2 is configured to measure a vertically downward deformation velocity of the surface of the measured material 6 ahead of the dynamic load acting force.

In an embodiment of the present application, each of the first type of velocimeter 1 and the second type of velocimeter 2 may be a Doppler velocimeter, which is not defined in the embodiments of the present application. The crossbeam body 3 is a cuboid part, and may be mounted on a measurement carrier 9. The specific mounting method is that the central axis of the crossbeam body 3 is parallel to the movement direction of the measurement carrier 9. The crossbeam body 3 is a rigid crossbeam, which means that the crossbeam body 3 itself has a small deformation during the measurement. The specific types of the measurement carrier 9 and the measured material 6 are not defined in the embodiments of the present application; for example, the measurement carrier 9 is a car and the measured material 6 is a road surface; alternatively, the measurement carrier 9 is a train and the measured material 6 is a rail. When the measurement carrier 9 moves along the surface of the measured material 6, loads may be applied to the measured material 6. Moving loads are formed on the surface of the measured material 6 as the measurement carrier 9 moves.

The velocimeters may be divided into the first type of velocimeter 1 and the second type of velocimeter 2 according to the purpose. The first type of velocimeter 1 is configured to measure a vertically resilient deformation velocity of the surface of the material behind the dynamic load acting force (the velocity direction being vertical upward), and the second type of velocimeter 2 is configured to measure a vertically downward deformation velocity of the surface of the material ahead of the dynamic load acting force. Wherein, "ahead of the dynamic load acting force" refers to a movement direction of the measurement carrier 9, and "behind the dynamic load acting force" refers to a direction opposite to the movement direction of the measurement carrier 9. Specifically, the first type of velocimeter 1 may be arranged behind the dynamic load application point, and the second type of velocimeter 2 may be arranged ahead of the dynamic load application point, which means, along the movement direction of the measurement carrier 9, the first type of velocimeter 1 is arranged behind the second type of velocimeter 2.

For the crossbeam for measuring deformation velocity of the surface of the material under dynamic loads provided by the embodiments of the present application, the vertically resilient deformation velocity as well as the vertically downward deformation velocity of the surface of the measured material can be obtained quickly and accurately simultaneously through the first type of velocimeter and the second type of velocimeter, respectively.

On the basis of the content of the foregoing embodiments, as an optional embodiment, the crossbeam for measuring deformation velocities of the surface of the material under dynamic loads further comprises: a third type of velocimeter 7, mounted on the crossbeam body 3; the third type of velocimeter 7 is configured to measure a noise velocity outside a deformation region of the surface of the measured material 6 ahead of the dynamic load acting force. Specifically, the third type of velocimeter 7 may be arranged ahead of the second type of velocimeter 2 on the crossbeam body 3 along the movement direction of the measurement carrier 9. The third type of velocimeter 7 is configured to measure a noise velocity outside a deformation region of the surface of the material ahead of the dynamic load acting force. The modulus of the measured material 6 can be further calculated based on the noise velocity.

On the basis of the content of the foregoing embodiments, as an optional embodiment, the crossbeam for measuring deformation velocities of the surface of the material under dynamic loads further comprises: range finders 5 and a judger, wherein the range finders 5 are mounted at both ends of the crossbeam body 3; the range finders 5 are configured to measure a working height of the crossbeam body 3 from the surface of the measured material 6; the judger is configured to judge, according to the working height, whether the distance between a velocimeter and the measured material 6 is within a set distance range; if it is not within the distance range, it is determined that the velocity data collected by the velocimeter is of low quality; wherein the velocimeter includes at least one of the first type of velocimeter 1, the second type of velocimeter 2, and the third type of velocimeter 7. Specifically, both ends of the crossbeam can be equipped with the range finders 5, which are configured to monitor the working height of the crossbeam, and then monitor the working state of the velocimeters to ensure the quality of the Doppler velocimeter data collection.

On the basis of the content of the foregoing embodiments, as an optional embodiment, the crossbeam for measuring deformation velocities of the surface of the material under dynamic loads further comprises: a gyroscope 4 mounted on the crossbeam body 3; the gyroscope 4 is configured to measure a tri-axial angular velocity of the crossbeam body 3 in an inertial space. Wherein, the gyroscope 4 may be a fiber optic gyroscope 4. Specifically, the gyroscope 4 may be arranged between the second type of velocimeter 2 and the third type of velocimeter 7. Moreover, the gyroscopes 4 are mounted on the crossbeam body 3, the number of the gyroscopes 4 is three, and the three gyroscopes 4 are arranged orthogonally in space. The gyroscopes 4 are configured to measure a tri-axial angular velocity of the crossbeam body 3 in an inertial space.

On the basis of the content of the foregoing embodiments, as an optional embodiment, the crossbeam for measuring deformation velocities of the surface of the material under dynamic loads further comprises: an acquirer; the acquirer is configured to acquire a modulus of the measured material 6 based on a deflection curve equation based on the vertically resilient deformation velocity, the vertically downward deformation velocity, the noise velocity, and the tri-axial angular velocity.

Specifically, the modulus of the measured material 6 can be obtained in combination with the deformation velocity of the surface of the material and the deflection curve equation. For example, in the measurement of modulus of a road surface, the vertically resilient deformation velocity as well as the vertically downward deformation velocity of the road surface can be simultaneously obtained by the crossbeam. Combining the measured deformation velocities of the road surface with the deflection curve slope equation (derivation of the deflection curve equation: $y(x)=Ae^{-Bx}(\sin(Bx)$ wherein, x represents the horizontal position of the deflection curve from the center of the load, y represents the deflection, A and B represent unknown deflection curve parameters. By means of establishing a set of deflection curve slope equations, the deflection curve parameters can be solved and then the modulus of the road surface can be obtained.

On the basis of the content of the foregoing embodiments, as an optional embodiment, the first type of velocimeter 1 comprises a plurality of first velocimeters, a horizontal mounting distance between the first velocimeter and a load center of the dynamic load is within a first set distance range, a mounting angle between the first velocimeter and the perpendicular line in a clockwise direction is within a first angle range, and the difference between the mounting angles of two first velocimeters is less than a first set value.

For example, the first type of velocimeter 1 consists of a plurality of first velocimeters of which the horizontal mounting distances from the load center are 0 m to 1.5 m (the first distance range). For different application scenarios, the mounting angle between the first velocimeter and the perpendicular line in a clockwise direction is 1° to 10° (the first angle range), and the difference between the mounting angles of any two of the first type of velocimeters 1 is less than 1° (the first set value).

The second type of velocimeter 2 comprises a plurality of second velocimeters, a horizontal mounting distance between the second velocimeter and a load center of the dynamic load is within a second distance range, a mounting angle between the second velocimeter and the perpendicular line in a clockwise direction is within a second angle range, and the difference between the mounting angles of two second velocimeters is less than a second set value.

For example, the second type of velocimeter 2 consists of a plurality of second velocimeters of which the horizontal mounting distances from the load center are 0 m to 2.5 m (the second distance range). For different application scenarios, the mounting angle between the second velocimeter and the perpendicular line in a clockwise direction is −10° to −1° (the second angle range), and the difference between the mounting angles of any two of the second type of velocimeters 2 is less than 1° (the second set value).

The third type of velocimeter 7 includes a third velocimeter, a horizontal mounting distance between the third velocimeter and a load center of the dynamic load is within a third distance range, a mounting angle between the third velocimeter and the perpendicular line in a clockwise direction is within a third angle range, and the difference between the mounting angles of the third velocimeter and the second velocimeter is less than a third set value.

For example, the third type of velocimeter 7 consists of a third velocimeter, and the horizontal mounting distance between it and the load center is 2.5 m to 4.5 m (the third distance range). For different application scenarios, the mounting angle between the third velocimeter and the perpendicular line in a clockwise direction is 1° to 10° (the third angle range), and the difference between the mounting angles of the third type of velocimeter 7 and the second type of velocimeter 2 is less than 1° (the third set value).

On the basis of the content of the foregoing embodiments, as an optional embodiment, the difference between mounting heights of centers of gravity of any two velocimeters among the first velocimeters, the second velocimeters and the third velocimeter in a direction of elevation is less than a first set distance; and the difference between mounting distances of centers of gravity of any two velocimeters among the first velocimeters, the second velocimeters and the third velocimeter in a horizontal direction perpendicular to a movement direction of the measurement carrier 9 is less than a second set distance.

For example, the difference between mounting heights of centers of gravity of the velocimeters in a direction of elevation is less than 0.25 m (the first set distance), and the difference between mounting distances of centers of gravity of the velocimeters in a horizontal direction perpendicular to a direction of travel is less than 0.2 m (the second set distance).

On the basis of the content of the foregoing embodiments, as an optional embodiment, the crossbeam body 3 is connected with the measurement carrier 9 through a shock-absorbing airbag 8. Wherein, the air pressure range used by the shock-absorbing airbag 8 is 5 atm±3 atm (506.625 kPa to 303.975 kPa).

As shown in FIG. 1, in a specific embodiment, the velocimeters corresponding to measuring points D1, D2, . . . , Dm are the first type of velocimeter 1 (Doppler vibration meter); the velocimeters corresponding to measuring points P1, P2, . . . , Pn are the second type of velocimeter 2 (Doppler vibration meter); and the velocimeter corresponding to measuring point R is the third type of velocimeter 7 (Doppler vibration meter);

the horizontal distances between the measuring points D1, D2, D3 and the load center are 100 mm, 300 mm, 750 mm, respectively;

the horizontal distances between the measuring points P1, P2, P3 and the load center are 100 mm, 300 mm, 750 mm, respectively;

the horizontal distance between the measuring point R and the load center is 3600 mm;

the mounting angle between the first type of velocimeter 1 and the perpendicular line in a clockwise direction is approximately 2°;

the mounting angle between the second type of velocimeter 2 and the perpendicular line in a clockwise direction is approximately −2°;

the mounting angle between the third type of velocimeter 7 and the perpendicular line in a clockwise direction is approximately −2°;

the difference between mounting heights of centers of gravity of the velocimeters in a direction of elevation is less than 0.05 m;

the difference between mounting distances of centers of gravity of the velocimeters in a horizontal direction perpendicular to a direction of travel is less than 0.01 m; and the air pressure used by the shock-absorbing airbag 8 is approximately 5 atm.

In summary, the crossbeam for measuring deformation velocities of the surface of the material under dynamic loads provided by the embodiments of the present application has the following advantages:

1. a measuring crossbeam that can quickly and accurately obtain the deformation velocities of the surface of the measured material is designed, which indirectly solves the problems in traditional methods for measuring the modulus of a material such as low measurement efficiency, and large errors in measurement results due to the fluctuation of the surface texture of the material;
2. the vertically resilient deformation velocity as well as the vertically downward deformation velocity of the measured material can be obtained at the same time;
3. the measuring crossbeam is designed to be linked with the measurement carrier through the shock-absorbing airbag during installation and use, which ensures the reliability of the measuring crossbeam when in use; and
4. the working state of the Doppler velocimeter can be monitored by disposing range finders at both ends of the crossbeam, so as to ensure the quality of the Doppler velocimeter data collection.

It should be noted that the embodiments above are only for illustrating the technical solutions of the present application, rather than limiting them; although the present application has been described in detail with reference to the foregoing embodiments, those skilled in the art should understand that the technical solutions documented in the preceding embodiments can still be modified, or parts of the technical features thereof can be equivalently substituted; and such modifications or substitutions do not make the corresponding technical solutions deviate from the spirit and scope of the various technical solutions of the embodiments of the present application.

The invention claimed is:

1. A crossbeam for measuring deformation velocities of a surface of a material under dynamic loads, comprising:
   a crossbeam body, a first type of velocimeter, a second type of velocimeter, and a third type of velocimeter;
   wherein the first type of velocimeter, the second type of velocimeter, and the third type of velocimeter are mounted on the crossbeam body, and the crossbeam body is mounted on a measurement carrier, wherein the crossbeam body is connected with the measurement carrier through a shock-absorbing airbag, the shock-absorbing airbag having an air pressure range of 5 atm±3 atm;
   the measurement carrier is configured to move along a surface of a measured material and apply the dynamic loads to the surface of the measured material;
   the first type of velocimeter is configured to measure a vertically resilient deformation velocity of the surface of the measured material behind the dynamic load acting force;
   the second type of velocimeter is configured to measure a vertically downward deformation velocity of the surface of the measured material ahead of the dynamic load acting force;
   the third type of velocimeter is configured to measure a noise velocity outside a deformation region of the surface of the measured material ahead of the dynamic load acting force;
   the first type of velocimeter comprises a plurality of first velocimeters, a horizontal mounting distance between the first velocimeter and a load center of the dynamic load is within a first distance range, a mounting angle between the first velocimeter and a perpendicular line in a clockwise direction is within a first angle range, and a difference between the mounting angles of two of the first velocimeters is less than a first set value;
   the second type of velocimeter comprises a plurality of second velocimeters, a horizontal mounting distance between the second velocimeter and a load center of the dynamic load is within a second distance range, a mounting angle between the second velocimeter and the perpendicular line in a clockwise direction is within a second angle range, and a difference between the mounting angles of two of the second velocimeters is less than a second set value;
   the third type of velocimeter comprises a third velocimeter, a horizontal mounting distance between the third velocimeter and a load center of the dynamic load is within a third distance range, a mounting angle between the third velocimeter and the perpendicular line in a clockwise direction is within a third angle range, and a difference between the mounting angles of the third velocimeter and the second velocimeter is less than a third set value;
   a difference between mounting heights of centers of gravity of any two velocimeters among the first velocimeters, the second velocimeters and the third velocimeter in a direction of elevation is less than a first set distance, wherein the first set distance is 0.25 m;
   a difference between mounting distances of centers of gravity of any two velocimeters among the first velocimeters, the second velocimeters and the third velocimeter in a horizontal direction perpendicular to a movement direction of the measurement carrier is less than a second set distance and greater than 0.0 m, wherein the second set distance is 0.2 m;
   range finders and a judger, wherein the range finders are mounted at both ends of the crossbeam body;
   wherein the range finders are configured to measure a working height of the crossbeam body from the surface of the measured material; and
   wherein the judger is configured to judge, according to the working height, whether the distance between the measured material and at least one of the first type of velocimeter, the second type of velocimeter, and the third type of velocimeter, is within a set distance range, and if it is not within the set distance range, it is determined that velocity data collected by the at least one of the first type of velocimeter, the second type of velocimeter, and the third type of velocimeter is of low quality.

2. The crossbeam for measuring velocities of the surface of the material under dynamic loads of claim 1, further comprising: a gyroscope mounted on the crossbeam body; and
   the gyroscope is configured to measure a tri-axial angular velocity of the crossbeam body in an inertial space.

3. The crossbeam for measuring velocities of the surface of the material under dynamic loads of claim 2, further comprising: an acquirer;
   the acquirer is configured to acquire a modulus of the measured material based on a deflection curve equation according to the vertically resilient deformation velocity, the vertically downward deformation velocity, the noise velocity, and the tri-axial angular velocity.

* * * * *